United States Patent [19]
Ito et al.

[11] Patent Number: 5,803,166
[45] Date of Patent: Sep. 8, 1998

[54] AIR CONDITIONING APPARATUS FOR VEHICLE

[75] Inventors: Yuji Ito, Ichinomiya; Takayoshi Kawai, Hoi-gun, both of Japan

[73] Assignee: Denso Corporation, Kariya, Japan

[21] Appl. No.: 808,571

[22] Filed: Feb. 28, 1997

[30] Foreign Application Priority Data

Mar. 1, 1996 [JP] Japan ................................ 8-045101

[51] Int. Cl.⁶ ................................................ F25B 29/00
[52] U.S. Cl. ................................ 165/203; 165/42
[58] Field of Search .................. 237/12.3 R; 165/203, 165/42, 43

[56] References Cited

U.S. PATENT DOCUMENTS

| | | | |
|---|---|---|---|
| 4,473,109 | 9/1984 | Kojima et al. | 165/12 |
| 4,858,677 | 8/1989 | Doi et al. | 165/12 |
| 5,199,485 | 4/1993 | Ito et al. | 165/203 |
| 5,390,728 | 2/1995 | Ban | 165/16 |
| 5,493,870 | 2/1996 | Kodama et al. | 62/155 |

FOREIGN PATENT DOCUMENTS 4-257716  9/1992  Japan .

*Primary Examiner*—Henry A. Bennett
*Assistant Examiner*—Derek S. Boles
*Attorney, Agent, or Firm*—Harness, Dickey & Pierce, PLC

[57] ABSTRACT

When the passenger compartment is rapidly heated (e.g., a target air temperature TAO(Rr)>a predetermined temperature T1) and the heating capacity of the rear-seat heater core is less than a predetermined capacity (e.g., water temperature Tw<a predetermined temperature Tw1), a fan of a heater unit is stopped to prevent a cool air form blown out from the heater unit, and a fan of a cooler unit is also stopped at that time. Thus, when air is blown out from both of the cooler unit and the heater unit to achieve a "cooling of a head area and heating of a foot area" for a passenger at a rear seat in a passenger compartment, it is prevented for only cool air to be blown out from the cooler unit not to give cool air feeling to the passenger at the rear seat in the passenger compartment.

9 Claims, 9 Drawing Sheets

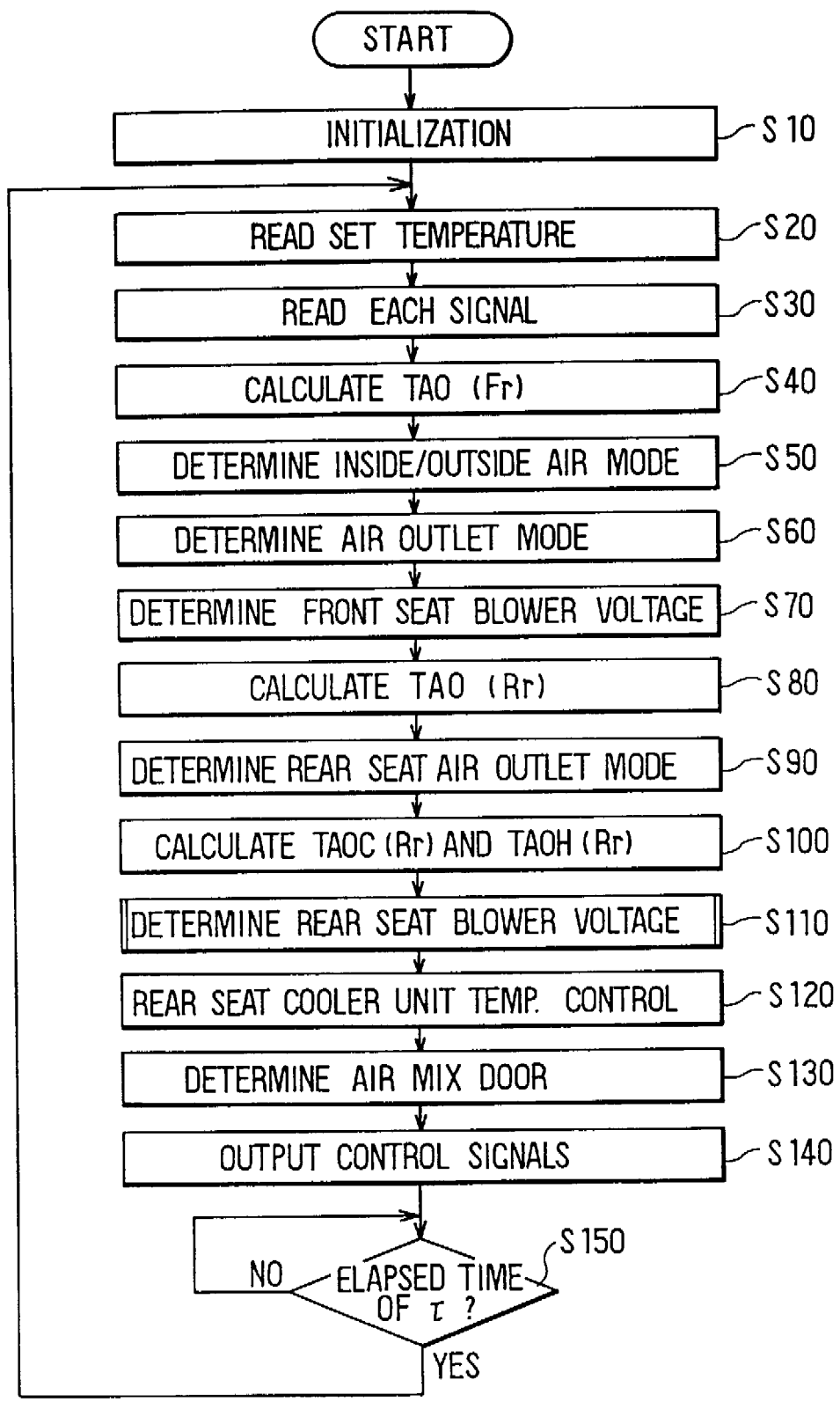

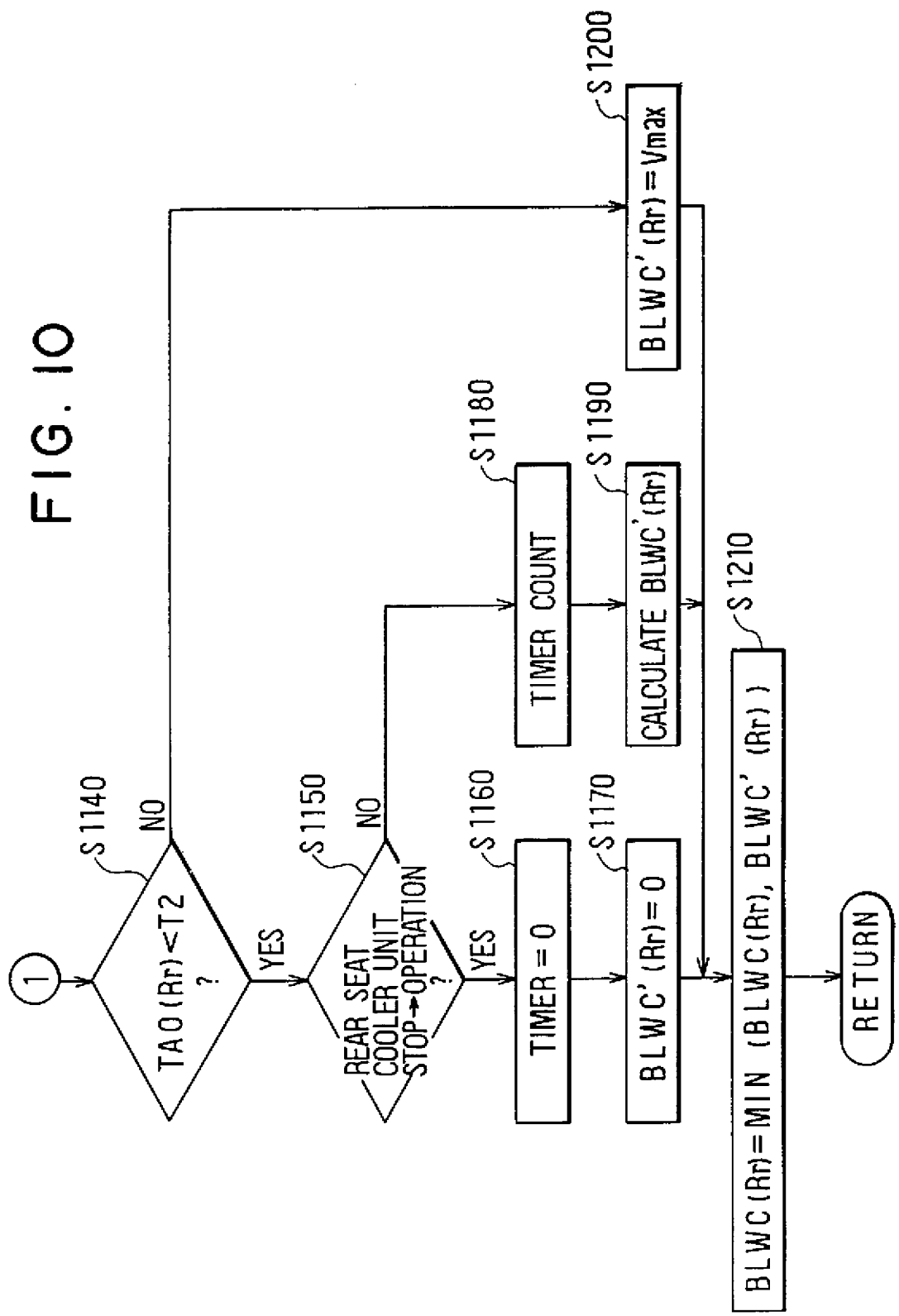

AIR CONDITIONING APPARATUS FOR VEHICLE

CROSS-REFERENCE TO RELATED APPLICATION

This application is related to and claims priority from Japanese Patent Application No. Hei. 8-45101 filed on Mar. 1, 1996, the contents of which are hereby incorporated by reference.

BACKGROUND OF THE INVENTION

1. Field of the Invention

The present invention relates to an air conditioning apparatus for a vehicle, which controls a cooler unit mainly for cooling a passenger compartment and a heater unit mainly for heating the passenger compartment.

2. Description of Related Art

Conventionally, there has been generally known an air conditioning apparatus for a vehicle, which includes a cooler unit having a fan used as air blowing means and an evaporator of a refrigerating cycle, and a heater unit having a fan used as air blowing means and utilizing an engine cooling water as a heat source, to cool a rear-seat space within a passenger compartment mainly by the cooler unit and to heat the rear-seat space within a passenger compartment mainly by the heater unit.

In the air conditioning apparatus for a vehicle, when only the heater unit is operated, if a temperature in the passenger compartment is lower than a target set temperature by a predetermined value and there is satisfied an air blowing stop condition in which a temperature of the engine cooling water is lower than a specified temperature, the fan of the heater unit is stopped to prevent cool air from being blown out. When the temperature of the engine cooling water becomes higher than the specified temperature after the air blowing stop condition is satisfied, a warm-up control is performed, that is, a rotational speed of the fan of the heater unit is gradually increased according to a rise of the temperature of the engine cooling water to blow warm air gradually.

In the air conditioning apparatus having the cooler unit and the heater unit, both units of the heater and the cooler cannot be operated automatically together. The inventors have studied a case in which the warm-up control is performed when both units are operated automatically together. As a result, it turns out that there occur the following problems.

When both units of the heater and the cooler are operated together, there is generally a state where a head portion and a foot portion of a passenger at a rear seat in the passenger compartment are to be cooled and to be warmed, respectively (cooling of the head area and heating of the foot area are performed). Thus, in this state, it is necessary to blow both cool air toward the upper half body of the passenger at the rear seat in the passenger compartment by the cooler unit and warm air toward the lower half body of the passenger at the rear seat by the heater unit.

When the warm-up control is performed while both units of the heater and cooler are operated together, the fan of the heater unit is stopped. However, because a heater core using the engine cooling water as a heat source is not located in the cooler unit, generally only the fan of the cooler unit continues to be operated.

As a result, although cool air and warm air are blown out by the cooler unit and the heater unit, respectively, to satisfy the state of the "cooling of the head portion and heating of the foot portion", only cool air is blown out into the passenger compartment by the cooler unit. Therefore, the temperature in the passenger compartment may be decreased, and there occurs a problem in that an unpleasant feeling is given to a passenger at the rear seat in the passenger compartment.

SUMMARY OF THE INVENTION

In view of the foregoing problems, it is an object of the present invention to provide an air conditioning apparatus for a vehicle, capable of solving the above-described problems.

According to present invention, when both of a cooler unit and a heater unit are operated and an air blowing stop condition is satisfied, that is, a heating capacity of a second heater exchanger is less than a predetermined capacity, a first air blowing means and a second air blowing means are stopped. Thus, when cool air is blown toward an upper half body of a passenger in a passenger compartment from the cooler unit and warm air is blown toward feet of the passenger in the passenger compartment from the heater unit to achieve an operation of "cooling of a head area and heating of a foot area", it is prevented for only cool air to be blown out from the cooler unit not to give a cool air feeling to the passenger in the passenger compartment. If air is blown out from the heater unit when the heating capacity of the second heater exchanger is less than the predetermined capacity, cool air feeling is given to the passenger in the passenger compartment.

Further, when the heating capacity reaches the predetermined capacity while stopping the first air blowing means, an air blowing capacity of the first air blowing means is gradually increased according to a rise of the heating capacity. Because each volume of the air from the cooler unit and the heater unit is gradually increased, an unpleasant feeling is not given to a passenger in the passenger compartment.

Still further, because each air blowing capacity from the cooler unit and the heater unit is gradually increased while maintaining equally a ratio between a volume of the cool air and a volume of the warm air, the operation of "cooling of the head area and heating of the foot area" can be achieved favorably for a passenger in the passenger compartment.

Still more further, after the heating capacity has reached the predetermined capacity, the first air blowing means of the cooler unit is not operated immediately but is stopped for a predetermined time, and then, the air blowing capacity of the first air blowing means is gradually increased after the predetermined time has elapsed. Thus, it is prevented for air mixed with warm air or foul-smelling air to be blown into the passenger compartment from the cooler unit when the air blowing capacity of the first air blowing means is increased after the heating capacity reaches the predetermined capacity.

BRIEF DESCRIPTION OF THE DRAWINGS

Additional objects and advantages of the present invention will be more readily apparent from the following detailed description of preferred embodiments when taken together with the accompanying drawings, in which:

FIG. 4 is a control flow chart by a microcomputer of the first embodiment;

FIG. 10 is a control flow chart showing in detail step S110 of FIG. 4;

DETAILED DESCRIPTION OF THE PRESENTLY PREFERRED EMBODIMENTS

Embodiments of the present invention will be described hereinafter with reference to the accompanying drawings.

A first embodiment in which an air conditioning apparatus is installed in one box car will be described with reference to FIGS. 1–17.

Figure 1:
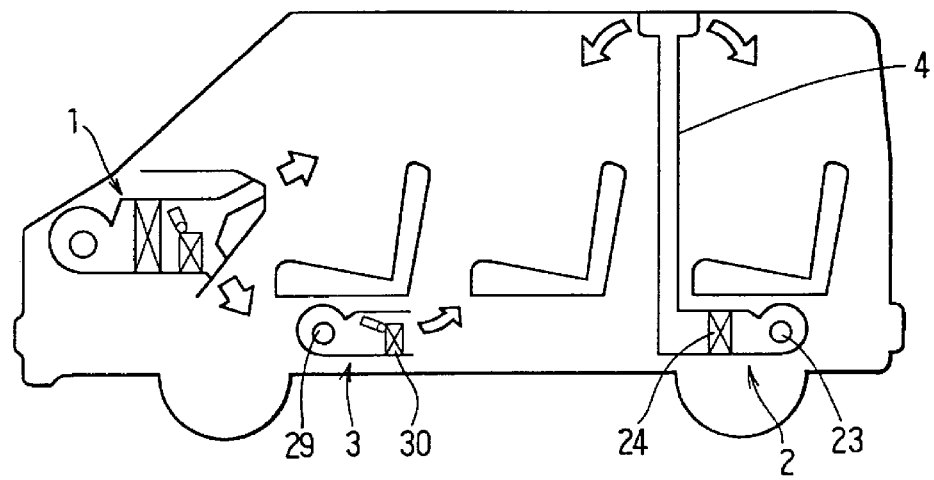
FIG. 1 is a schematic diagram showing positions of each unit mounted on a vehicle according to a first embodiment of the present invention.

As shown in FIG. 1, a front-seat air conditioning unit 1 for cooling and heating a front-seat-side space is disposed at a front side of a vehicle, a rear-seat cooler unit 2 for cooling a rear-seat-side space and a rear-seat heater unit 3 for heating the rear-seat-side space are respectively disposed at a rear side of the vehicle.

The front-sear air conditioning unit 1 is located inside an instrument panel installed at the front-seat side of the vehicle. From the position where the front-seat air conditioning unit 1 is located, air is blown toward an upper half body and a lower half body of a passenger at the front-seat in the passenger compartment and an inner surface of a windshield.

The rear-seat cooler unit 2 is disposed at the rear-seat side in a space between an inner wall of the passenger compartment and an outer plate of the vehicle, and blows air from a ceiling of the vehicle toward the upper half body of a passenger at the rear seat in the passenger compartment, particularly toward the head area, through a ceiling duct 4.

The rear-seat heater unit 3 is disposed below a passenger seat next to a driver's seat, and mainly blows warm air toward a foot area of the passenger at the rear seat in the passenger compartment.

Figure 3:
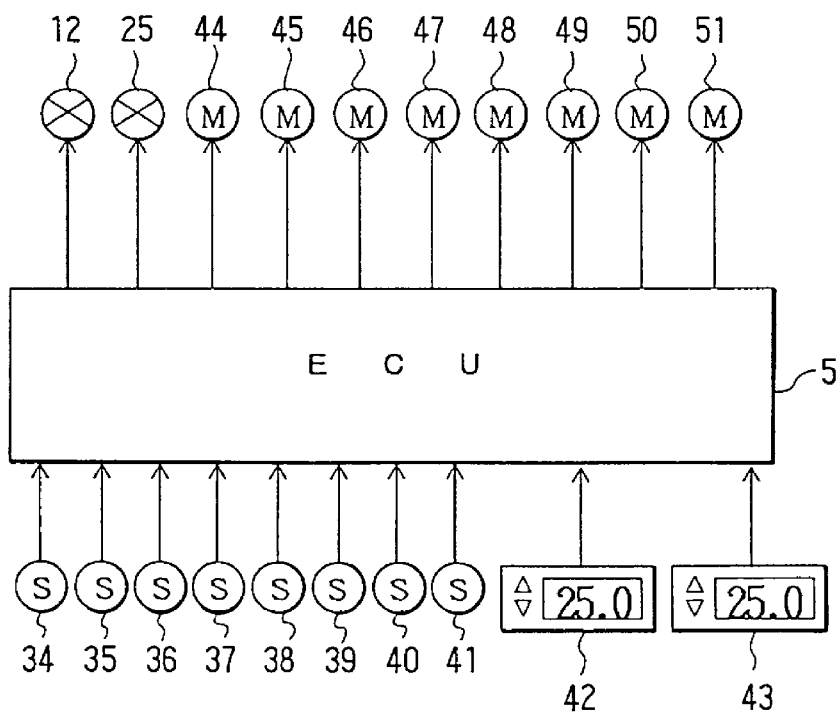
FIG. 3 is a block diagram of a control system of the first embodiment.

Each air conditioning means of the units 1 through 3 are independently controlled by an ECU 5 (i.e., electronic control unit, refer to FIG. 3).

Figure 2A:
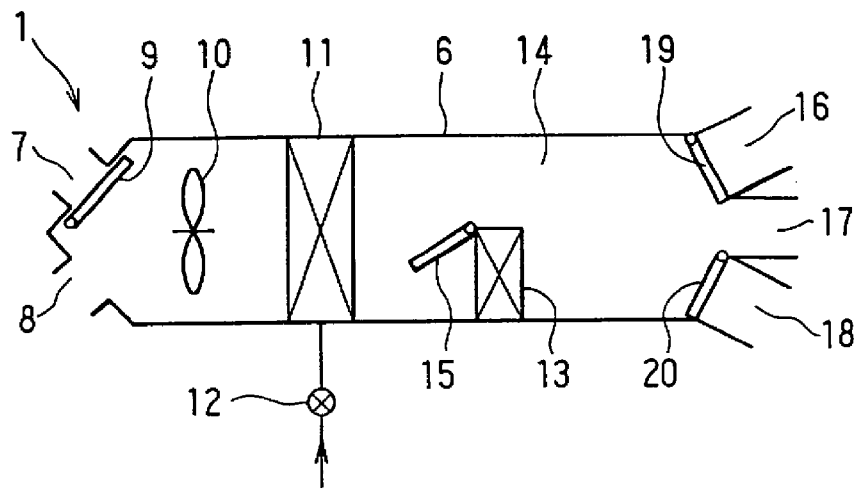
FIG. 2A is a schematic diagram of a front-seat air conditioning unit of the first embodiment.

Next, a structure of the front-seat air conditioning unit 1 is described with reference to FIG. 2A.

In an air conditioning case 6, there is formed at an air upstream side an inside air inlet 7 for sucking inside air inside the passenger compartment and an outside air inlet 8 for sucking outside air outside the passenger compartment. Further, an inside/outside air switching door 9 for switching a suction ratio between the inside air and the outside air is disposed at a portion where the inside air inlet 7 and the outside air inlet 8 are branched. The inside/outside air switching door 9 is driven by a servo motor 44 as driving means (refer to FIG. 3).

A fan 10 as air blowing means is disposed at a downstream side of the inside/outside air switching door 9. The fan 10 is driven by a blower motor 49 as driving means (refer to FIG. 3), a rotational speed of the fan 10, that is, a volume of air blowing into the passenger compartment is controlled by a blower voltage applied to the blower motor 49. The blower voltage is determined by the ECU 5.

A front-seat evaporator 11 employed as a cooling heat exchanger is disposed at a downstream side of the fan 10. The front-seat evaporator 11, a compressor (not shown) driven by an engine of the vehicle, and a condenser, decompression means (not shown) and the like are connected together with a refrigerating pipe (not shown) to constitute a known refrigerating cycle. An electromagnetic valve 12 for controlling a refrigerant flowing into the front-seat evaporator 11 is disposed in the refrigerating pipe at an upstream side of the front-seat evaporator 11 with reference to a flow of the refrigerant.

A front-seat heater core 13 employed as a heating heat exchanger is disposed at a downstream side of the front-seat evaporator 11. An engine cooling water flows inside the front-seat heater core 13. The heater core 13 utilizes the engine cooling water as a heat source and reheats the air passing through the front-seat heater core 13. A bypass passage 14 is formed in the air conditioning case 6 so that the air having been cooled by the front-seat evaporator 11 can bypass the front-seat heater core 13.

An air mixing door 15 employed as temperature adjusting means for adjusting a ratio of a volume of the air passing through the front-seat heater core 13 and a volume of air passing through the bypass passage 14 is disposed within the air conditioning case 6. The air mixing door 15 is driven by a servo motor 45 as driving means.

Further, in the air conditioning case 6, there are formed at a downstream side a defroster outlet 16 for blowing out the conditioned air to the inner surface of the windshield, a front-seat face outlet 17 for blowing the conditioned air toward an upper half body of a passenger at a front seat in the passenger compartment, and a front-seat foot outlet 18 for blowing the conditioned air toward a foot area of the passenger at the front seat in the passenger compartment. In the air conditioning case 6, there are disposed at an upstream side of these outlets 16 through 18 a defroster door 19 for opening or closing the defroster outlet 16 and a face/foot switching door 20 for selectively opening and closing the front-seat face outlet 17 and the front-seat foot outlet 18. These doors 19 and 20 are driven by servo motors 46 and 47 (refer to FIG. 3) as driving means.

Figure 2B:
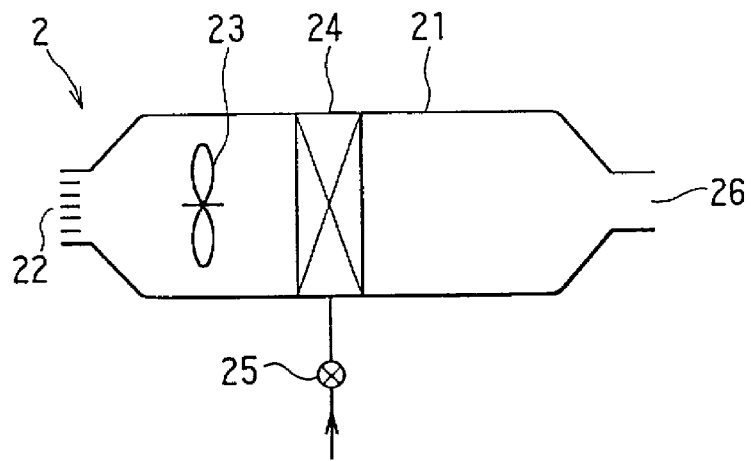
FIG. 2B is a schematic diagram of a rear-seat cooler unit of the first embodiment.

Next, a structure of the rear-seat cooler unit 2 is described with reference to FIG. 2B.

In the cooler case 21 for forming an air passage, there is formed at an upstream side an inside air inlet 22 opened toward the foot area of a passenger at the rear seat in the passenger compartment is formed. A fan 23 as air blowing means is disposed within the cooler case 21. The fan 23 is driven by a blower motor 50 as driving means (refer to FIG. 3), a rotational speed of the fan 23 is controlled by a blower voltage applied to the blower motor 50. The blower voltage is determined by the ECU 5.

A rear-seat evaporator 24 used as a cooling heat exchanger is disposed at the downstream side of the fan 23. The rear-seat evaporator 24 constitutes the same refrigerating cycle with the front-seat evaporator 11. An electromagnetic valve 25 as cooling capacity adjusting means for controlling a refrigerant flowing into the rear-seat evaporator 24 is disposed in the refrigerating pipe at an upstream side of the rear-seat evaporator 24 with reference to a flow of the refrigerant. Further, in the cooler case 21, there is formed at a downstream side a rear-seat face outlet 26 connected to the ceiling duct 4.

Figure 2C:
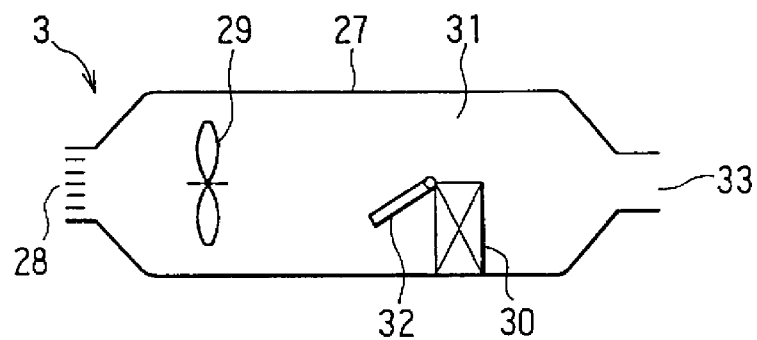
FIG. 2C is a schematic diagram of a rear-seat heater unit of the first embodiment.

Next, a structure of the rear-seat heater unit 3 is described with reference to FIG. 2C.

In the heater case 27 for forming an air passage, there is formed at an upstream side an inside air inlet 28 opened toward the foot area of the passenger seat next to the driver's seat. A fan 29 as blowing means is disposed within the heater case 27, and is driven by a blower motor 51 as driving means. A rotational speed of the fan 29 is controlled by a blower voltage applied to a blower motor 51. The blower voltage is determined by the ECU 5 (refer to FIG. 3).

A rear-seat heater core 30 employed as a heating heat exchanger is disposed at a downstream side of the fan 29. An engine cooling water flows within the rear-seat heater core 30. The heater core 13 utilizes the engine cooling water as a heat source and reheats the air passing through the rear-seat heater core 30. A bypass passage 31 is formed in the heater case 27 so that the air flowing from the fan 29 can bypass the rear-seat heater core 30.

An air mixing door 32 as temperature adjusting means for adjusting a ratio between a volume of the air passing through the rear-seat heater core 30 and a volume of the air passing through the bypass passage 31 is disposed within the heater case 27. The air mixing door 32 is driven by a servo motor 48 as driving means (refer to FIG. 3).

Further, in the heater case 27, there is formed at a downstream side a rear-seat foot outlet 33. A rear-seat foot duct (not shown) for blowing out the conditioned air toward the lower half body of the passenger at the rear-seat in the passenger compartment is connected to the rear-seat foot outlet 33.

A structure of the control system of the present embodiment will be hereinafter described with reference to FIG. 3.

The ECU 5 for controlling each air conditioning means of the units 1 through 3 includes a microcomputer composed of CPU, ROM, RAM and the like; driving circuits for controlling the blower voltages applied to the blower motors 49 through 51; and A/D converter and the like. When an ignition switch of the vehicle is closed, an electric power is supplied from a battery (not shown) to the ECU.

As shown in FIG. 3, signals from a front-seat inside air temperature sensor 34 for detecting a temperature of the front-seat side in the passenger compartment, a rear-seat inside air temperature sensor 35 for detecting a temperature of the rear-seat side in the passenger compartment, an outside air temperature sensor 36 for detecting an outside air temperature, a sunlight sensor 37 for detecting an amount of sunlight entering the passenger compartment, a front-seat evaporator temperature sensor 38 for detecting a temperature of air cooled by the front-seat evaporator 11 (i.e., a temperature of air immediately after passing through the evaporator 11), a rear-seat evaporator temperature sensor 39 for detecting a temperature of air cooled by the rear-seat evaporator 24 (i.e., a temperature of the air immediately after passing through the evaporator 24), a water temperature sensor 40 for detecting a temperature of the engine cooling water, a suction air temperature sensor 41 for detecting a temperature of air sucked from the inside air inlet 28 into the heater case 27, a front-seat temperature setting device 42 for setting a target temperature in the front seat and a rear-seat temperature setting device 43 for setting a target temperature in the rear seat are respectively input to the ECU 5.

Signals from the respective sensors 34–41 are input to the microcomputer after being converted from an alternating current to a direct current by the A/D converter of the ECU 5.

From an output terminal of the ECU 5, control signals are output to the electromagnetic valves 12 and 25, the servo motors 44–48 and the bower motors 49–51.

The front-seat temperature setting device 42 is disposed on a front-seat air conditioning panel formed in the instrument panel at the front-seat side. Further, on the front-seat air conditioning panel, a switch for selectively opening and closing the respective air blowing outlet modes, a switch for selectively opening and closing the respective inside/outside modes, a switch for adjusting a volume of the air blown into the passenger compartment, and an auto-switch for automatically controlling each air conditioning means of the front-seat air conditioning unit 1 and the like are disposed (not shown).

The rear-seat temperature setting device 43 is disposed on a rear-seat air conditioning panel formed at the ceiling portion of the rear-seat side. Further, on the rear-seat air conditioning panel, a switch for adjusting a volume of the air blown into the passenger compartment, and an auto-switch for automatically controlling each air conditioning means of the rear-seat cooler unit 2 and the rear-seat heater unit 3 and the like are disposed (not shown).

A control processes of the above-described microcomputer will be described with reference to FIG. 4.

When an electric power is supplied to the ECU 5 by turning on the ignition switch, a routine shown in FIG. 4 starts and an initialization process is performed at step S10. At the next step S20, a front-seat setting temperature Tset(Fr) and a rear-seat setting temperature Tset(Rr) set by the respective temperature setting devices 42 and 43 are read. At the next step S30, signals Tr(Fr), Tr(Rr), Tam, Ts, Te(Fr), Te(Rr), Tw, Tin(Rr) from the above-described sensors 34–41 are input after being converted from a alternating current to a direct current by the A/D converter.

At the next step S40, a target temperature TAO(Fr) of air blown toward the front-seat side is calculated by the following equation (1) pre-stored in the ROM.

$$TAO(Fr)=Kset(Fr) \times Tset(Fr)-Kr(Fr) \times Tr(Fr)-Kam(Fr) \times Tam-Ks(Fr) \times Ts+C(Fr) \ (°C.) \quad (1)$$

wherein, Kset(Fr), Kr(Fr), Kam(Fr), and Ks(Fr) are gains for correction, and C(Fr) is a constant for correction.

Figure 5:
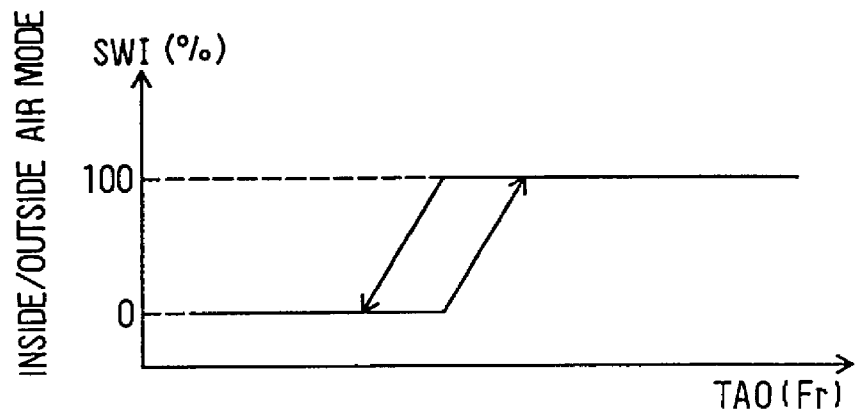
FIG. 5 is a graph showing a relationship between inside and outside air modes of a front-seat side and a target air temperature TAO(Fr) according to the first embodiment.

At the next step S50, inside and outside air modes of the front-seat air conditioning unit 1 are determined based on the above-described TAO(Fr) and the graph in FIG. 5 pre-stored in the ROM. In FIG. 5, SWI shows a target opening degree of the inside/outside air switching door 9. When the SWI is 100(%), the operation is in a complete outside air introduction mode. When the SWI is 0(%), the operation is in a complete inside air circulation mode.

Figure 6:
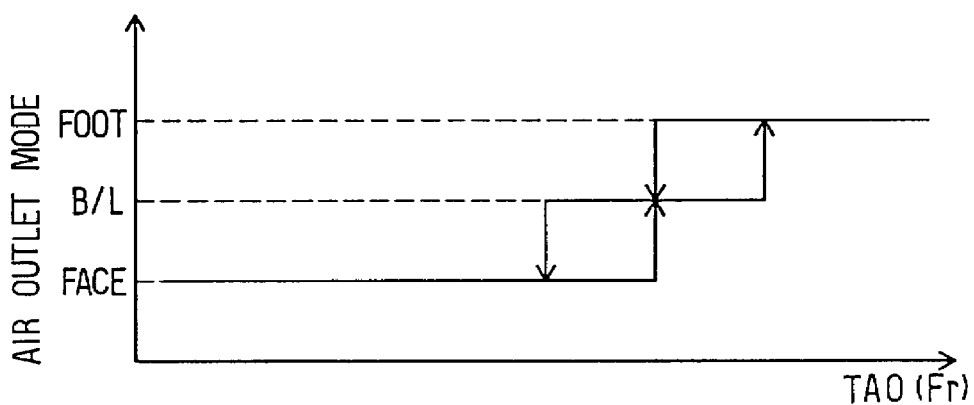
FIG. 6 is a graph showing a relationship between air outlet modes of the front-seat side and a target air temperature TAO(Fr) according to the first embodiment.

At the next step S60, the air outlet modes of the front-seat air conditioning unit 1 are determined by the TAO(Fr) and the graph in FIG. 6 pre-stored in the ROM.

In a face mode (FACE), the conditioned air is blown out toward the upper half body of the passenger at the front seat in the passenger compartment from the front-seat face outlet 17. In a Bi-level mode (B/L), the conditioned air is blown out toward the upper half body and the foot area of the passenger at the front seat in the passenger compartment from the front-seat face outlet 17 and the front-seat foot outlet 18. In a foot mode (FOOT), the conditioned air is blown out toward the foot area of the front seat passenger in the passenger compartment from the front-seat foot outlet 18.

Figure 7:
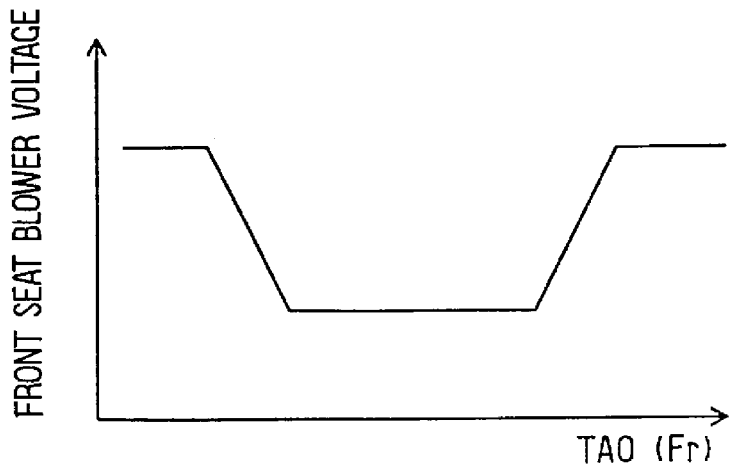
FIG. 7 is a graph showing a relationship between a front-seat blower voltage and a target air temperature TAO (Fr) according to the first embodiment.

At the next step S70, the front-seat blower voltage applied to the blower motor 49 of the front-seat air conditioning unit 1 is determined by the TAO(Fr) and the graph in FIG. 7 pre-stored in the ROM.

At the next step S80, a target temperature TAO(Fr) of air blowing toward the rear-seat side is calculated by the following equation (2) pre-stored in the ROM.

$$TAO(Rr)=Kset(Rr) \times Tset(Rr)-Kr(Rr) \times Tr(Rr)-Kam(Rr) \times Tam-Ks(Rr) \times Ts+C(Rr)+f(Rr) \ (°C.) \quad (2)$$

wherein, Kset(Rr), Kr(Rr), Kam(Rr), and Ks(Rr) are gains for correction, and C(Rr) is a constant for correction. Further, f(Rr) is a correction term for correcting a heat transfer (i.e., a temperature interference) from the front seat to the rear seat, and f(Rr) can be shown in the following equation (3) by using a constant α, for example.

$$f(Rr)=\alpha \times [Tset(Fr)-Tset(Rr)] \quad (3)$$

Figure 8:
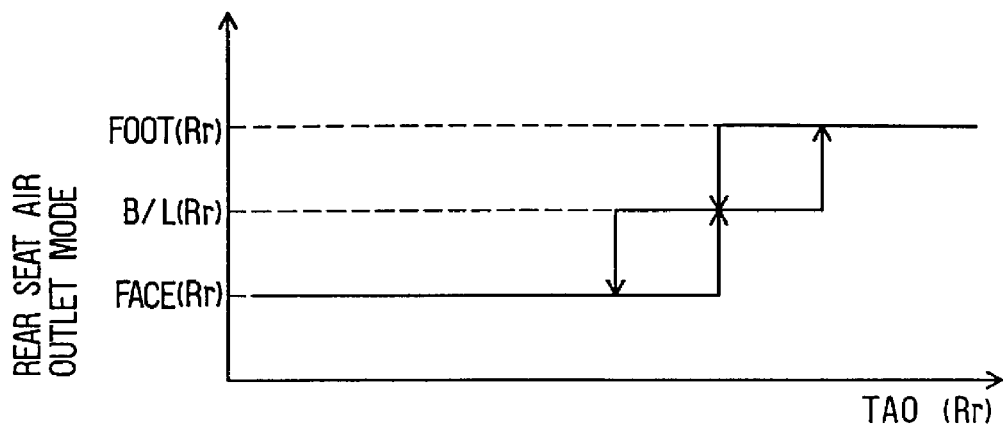
FIG. 8 is a graph showing a relationship between air outlet modes of a rear-seat side and a target air temperature TAO(Rr) according to the first embodiment.

At the next step S90, the air outlet modes of the rear-seat cooler unit 2 and the rear-seat heater unit 3 are determined by TAO(Rr) and the graph in FIG. 8 pre-stored in the ROM.

In a rear-seat face mode FACE(Rr), only the rear-seat cooler unit 2 is operated. In a rear-seat Bi-level mode (B/L), the rear-seat cooler unit 2 and the rear-seat heater unit 3 are operated together. In a rear-seat foot mode FOOT(Rr), only the heater unit 3 is operated.

At the next step S100, a target air temperature TAOC(Rr) of the rear-seat cooler unit 2 and a target air temperature TAOH(Rr) of the rear-seat heater unit 3 are calculated.

Specifically, in the rear-seat face mode, because only the rear-seat cooler unit 2 is operated, the TAOC(Rr) is calculated based on the following equation (4) pre-stored in the ROM. In the rear-seat Bi-level mode, because the two unit 2 and 3 are operated together, the TAOC(Rr) and TAOH(Rr) are calculated based on the following equations (5) and (6) pre-stored in the ROM. Further, in the rear-seat foot mode, because only the rear-seat heater mode 3 is operated, the TAOH(Rr) is calculated based on the following equation (7) pre-stored in the ROM.

$$TAOC(Rr)=TAO(Rr) \ (°C.) \quad (4)$$

$$TAOC(Rr)=TAO(Rr)-TA \ (°C.) \quad (5)$$

$$TAOH(Rr)=TAO(Rr)+TA \ (°C.) \quad (6)$$

$$TAOH(Rr)=TAO(Rr) \ (°C.) \quad (7)$$

In the rear-seat Bi-level mode, there is a temperature difference between TAOC(Rr) and TAOH(Rr), so that air blown toward the rear seat has a temperature difference between the upper side and the lower side to realize the operation of "cooling of the head area and heating of the foot area". TA in the above equations (5) and (6) is a predetermined temperature (i.e., 10° C. in the embodiment).

Figure 9:
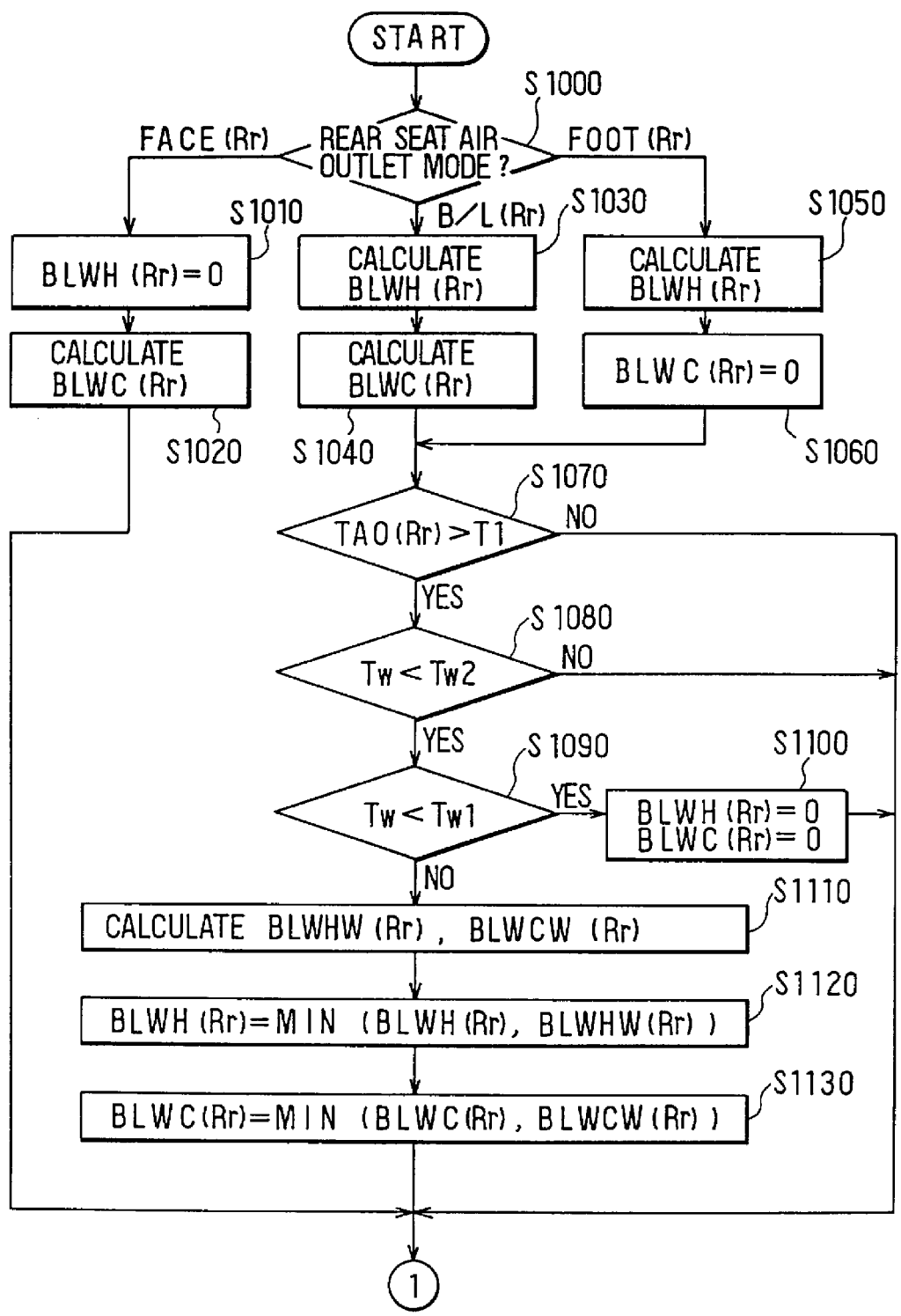
FIG. 9 is a control flow chart showing in detail step S110 of FIG. 4.

When it proceeds to the next step S110, the subroutines in FIGS. 9 and 10 are called, so that a rear-seat cooler blower voltage BLWC(Rr) applied to the blower motor 50 of the rear-seat cooler unit 2 and a rear-seat heater blower voltage BLWH(Rr) applied to the blower motor 51 of the rear-seat heater unit 3 are determined. The process shown in FIGS. 9 and 10 is described.

At step S1000, a branch is performed according to the rear-seat air outlet mode determined at step S90. When the rear-seat face mode is determined at step S1000, BLWH(Rr) is set for zero at the next step S1010. At the next step S1020, BLWC(Rr) is calculated based on TAO(Rr) and the graph of the full line in FIG. 11 pre-stored in the ROM.

Figure 11:
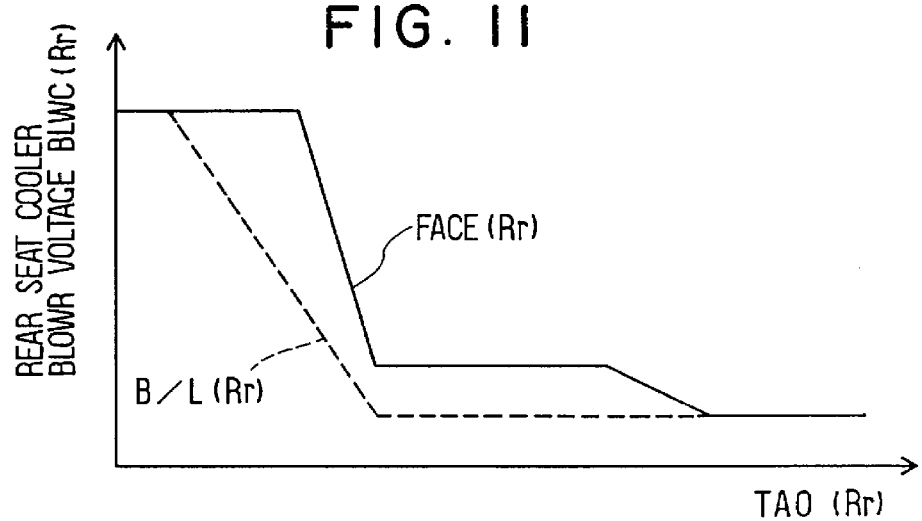
FIG. 11 is a graph showing a relationship between a rear-seat cooler blower voltage BLWC(Rr) and a target air temperature TAO(Rr) according to the first embodiment.
Figure 12:
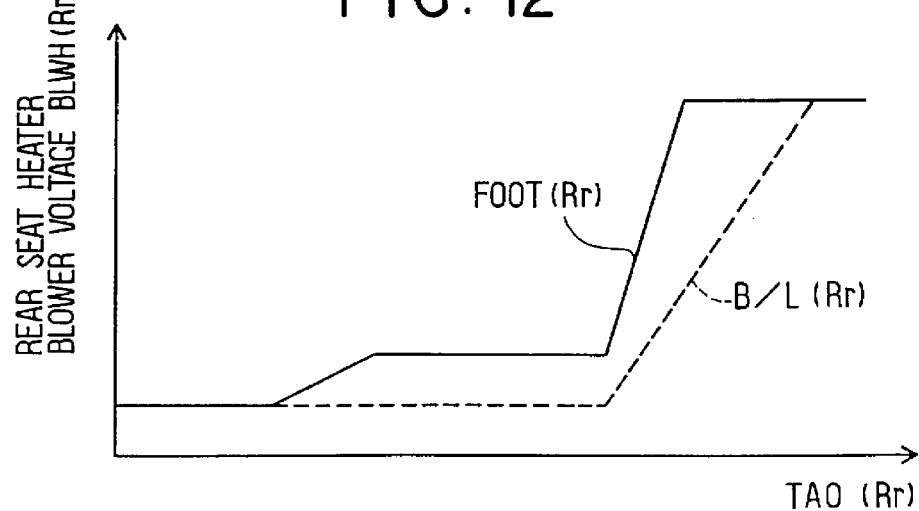
FIG. 12 is a graph showing a relationship between a rear-seat heater blower voltage BLWH(Rr) and a target air temperature TAO(Rr) according to the first embodiment.

When the rear-seat Bi-level mode is determined at step S1000, BLWH(Rr) is calculated based on TAO(Rr) and the graph of the broken line in FIG. 12 pre-stored in the ROM at step S1030, and BLWC(Rr) is calculated based on TAO (Rr) and the graph of the broken line in FIG. 11 pre-stored in the ROM at the next step S1040. Then, it proceeds to step S1070.

When the rear-seat foot mode is determined at step S1000, BLWH(Rr) is calculated based on TAO(Rr) and the graph of the full line in FIG. 12 pre-stored in the ROM. Then, at the next step S1060, BLWC(Rr) is set for zero.

The blower voltages BLWC(Rr) and BLWH(Rr) in the rear-seat Bi-level mode are smaller than the blower voltage BLWC(Rr) in the rear-seat face mode or the blower voltage BLWH(Rr) in the rear-seat foot mode as shown in FIGS. 11 and 12, because the volume of the air in the rear-seat face mode or the rear-seat foot mode is distributed to the two units 2 and 3 in the rear-seat Bi-level mode.

At step S1070, it is determined whether or not the TAO(Rr) is equal to or more than a predetermined temperature T1 (T1=40° C., in the embodiment) to determine whether or not it is in a mode for rapidly heating the passenger compartment. When the determination is "NO", it jumps to step S1140 in FIG. 10. When the determination is "YES", it is in the mode for rapidly heating the passenger compartment, and therefore, a determination of the next step S1080 is performed.

At step S1080, it is determined whether or not water temperature Tw detected by the water temperature sensor 40 is equal to or less than a first predetermined water temperature Tw2 (Tw2=65° C., in the embodiment) to determine whether or not it is necessary to perform the warm-up control. When the determination is "NO", it jumps to step S1140 in FIG. 10. When the determination is "YES", it is necessary to perform the warm-up control, and therefore, a determination of the next step S1090 is performed.

At step S1090, it is determined whether or not the detected water temperature Tw is equal to or less than a second predetermined water temperature Tw1 (Tw1=35° C., in the embodiment) to determine whether or not a heating capacity for air, of the rear-seat heat core 30, is equal to or less than a predetermined capacity. When the determination is "YES", the heating capacity for the air is less than a predetermined capacity, so that an air blowing stop condition is satisfied. At this time, when air is blown into the passenger compartment, a stove ratio (blown-air temperature) is decreased and a cool air feeling is given to a passenger at the rear seat in the passenger compartment. Therefore, at step S1100, the blower voltages BLWC(Rr) and BLWH(Rr) are set for zero. The process of step S1100 is a main portion of the embodiment.

Figure 13:
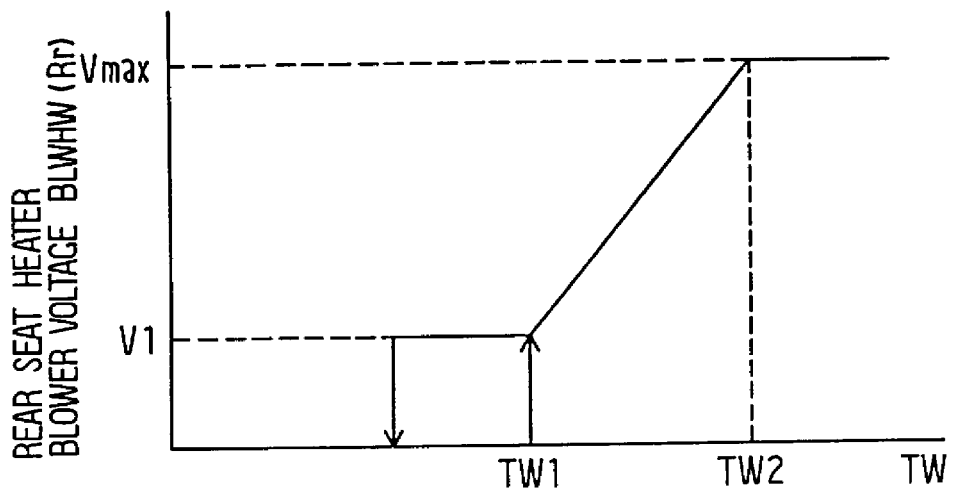
FIG. 13 is a graph showing a relationship between a rear-seat heater blower voltage BLWHW(Rr) and a water temperature Tw.
Figure 14:
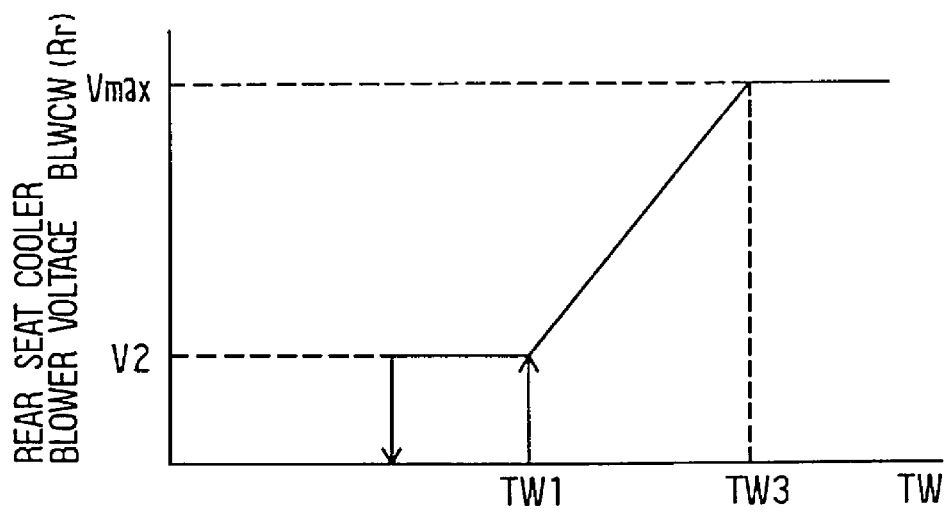
FIG. 14 is a graph showing a relationship between a rear-seat cooler blower voltage BLWCW(Rr) and a water temperature Tw.

Further, when the determination is "NO" at step S1090, the rear-seat heater blower voltage BLWHW(Rr) and the rear-seat cooler blower voltage BLWCW(Rr) are calculated based on the detected water temperature Tw and the graphs shown in FIGS. 13 and 14 pre-stored in the ROM.

The graphs in FIGS. 13 and 14 are set such that a ratio between the volume of the air blown from the rear-seat cooler unit 2 and the volume of the air blown from the rear-seat heater unit 3 is always equal regardless of the detected water temperature Tw when the fan 29 of the rear-seat heater unit 3 and the fan 23 of the rear-seat cooler unit 2 are controlled by the blower voltages obtained in the graphs of FIGS. 13 and 14.

Because the characteristic of the fan 29 of the rear-seat heater unit 3 and the characteristic of the fan 23 of the rear-seat cooler unit 2 are different from each other, the graph in FIG. 13 and the graph in FIG. 14 are different from each other correspondingly.

At the next step S1120, the rear-seat heater blower voltage BLWH(Rr) is set for the smaller one of BLWH(Rr) calculated in FIG. 12 and BLWHW(Rr) calculated in FIG. 13. Further, at the next step S1130, the rear-seat cooler blower voltage BLWC(Rr) is set for the smaller one of BLWC(Rr) calculated in FIG. 11 and BLWHW(Rr) calculated in FIG. 14.

At step S1140 in FIG. 10, it is determined whether or not TAO(Rr) is equal to or less than a predetermined temperature T2 to determine whether or not it is necessary to perform a cool-down control. If the fan 23 of the rear-seat cooler unit 2 is immediately operated when the determination is "YES", air mixed with hot air or foul-smelling air may be blown into the passenger compartment. Therefore, when the determination is "YES", the electromagnetic valve 25 is firstly opened and the rear-seat evaporator 24 is operated to stop the fan 23 of the rear-seat cooler unit 2 for a predetermined time t1. Then, the cool-down control in which the rotational speed of the fan 23 of the rear-seat cooler unit 2 is gradually increased is performed.

That is, at step S1150, it is firstly determined whether or not the rear-seat cooler unit 2 is at a time of switching from a stopping state to an operating state. When the determination is "YES" at step S1150, it corresponds to the time of switching from the "YES" determination state to the "NO" determination state at step S1090 in FIG. 9. When the determination is "YES" at step S1150, the timer is reset for zero at step S1160, and the rear-seat cooler blower voltage BLWC'(Rr) is set for zero at step 1170. Then, it proceeds to step S1210.

Figure 15:
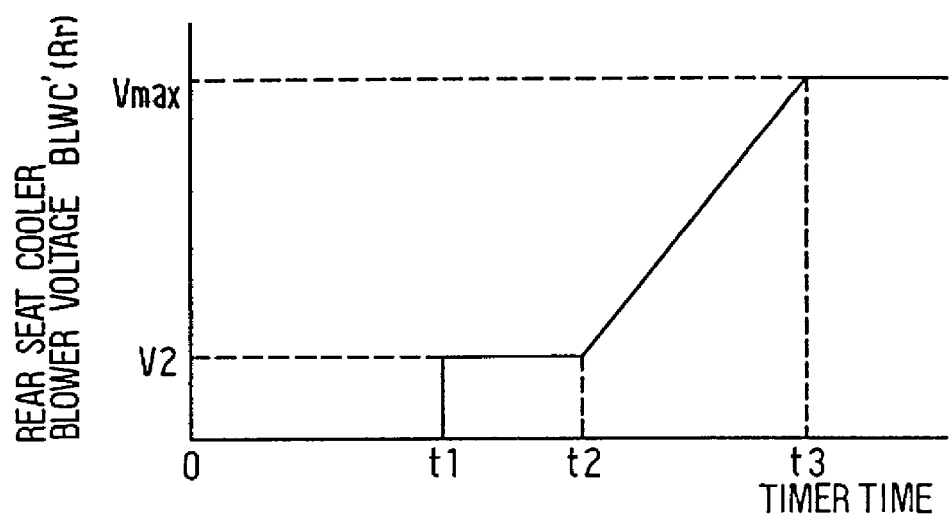
FIG. 15 is a graph showing a relationship between a rear-seat cooler blower voltage BLWC'(Rr) and a time of a timer.

On the other hand, when the determination is "NO" at step S1150, the time of the timer is counted up at step S1180, and the rear-seat cooler blower voltage BLWC'(Rr) is calculated based on the time of the timer and the graph in FIG. 15 pre-stored in the ROM. Then, it proceeds to step S1210.

The graph shown in FIG. 15 is set such that BLWC'(Rr) is 0 when the time of the timer is in a range of 0–t1, BLWC'(Rr) is V2 (equal to V2 in FIG. 14) when the time of the timer is in a range of t1–t2, and BLWC'(Rr) is gradually increased according to the elapsed time of the timer when the time of the timer is in a range of t2–t3. In the embodiment, t1=3 (sec.), t2=5 (sec.), and t3=10 (sec.).

When the determination is "NO" at step S1140, the rear-seat cooler blower voltage BLWC'(Rr) is set for the maximum value Vmax, and it proceeds to step S1210.

At step 1210, the rear-seat cooler blower voltage BLWC (Rr) is set for the smaller one of BLWC(Rr) calculated at any of steps S1020, S1040, S1060, S1100, and S1130 of FIG. 9 and BLWC(Rr) calculated at any of steps S1170, S1190, and S1200 of FIG. 10. Then, it exits the subroutine.

After exiting the subroutine, it proceeds to step S120 in FIG. 4, and a temperature of air blown out from the rear-seat cooler unit 2 is controlled. Specifically, the target evaporator temperature TEO(Rr) is firstly determined based on the TAOC(Rr) calculated by the above-described equation (4) or 5 and the graph in FIG. 16 pre-stored in the ROM.

Figure 16:
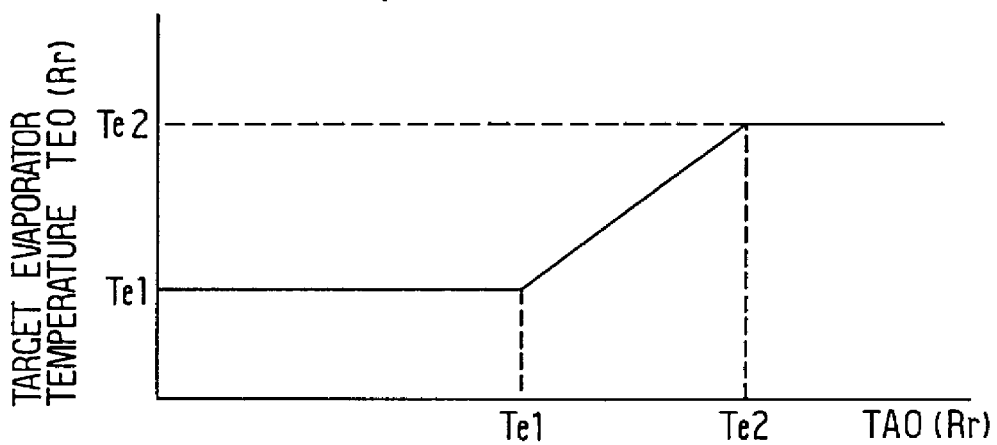
FIG. 16 is a graph showing a relationship between a target evaporator temperature TEO(Rr) of the rear-seat cooler unit and a target air temperature TAO(Rr)

In the graph of FIG. 16, when TAO(Rr)≦Te1 (Te1=0, in the embodiment) (°C.), TEO(Rr)=Te1 (°C.), i.e., TEO(Rr) is constant, to prevent the rear-seat evaporator 24 from being frosted.

Further, when Te1≦TAO(Rr)≦Te2 (Te2=15 in the embodiment) (°C.), TEO(Rr)=TAO(Rr). When TAO(Rc) ≧Te2 (°C.), TEO(Rr)=Te2 (°C.). If the temperature of air blown out from the rear-seat evaporator 24 is equal to or more than Te2, foul-smelling air may be generated from the rear-seat evaporator 24.

Figure 17:
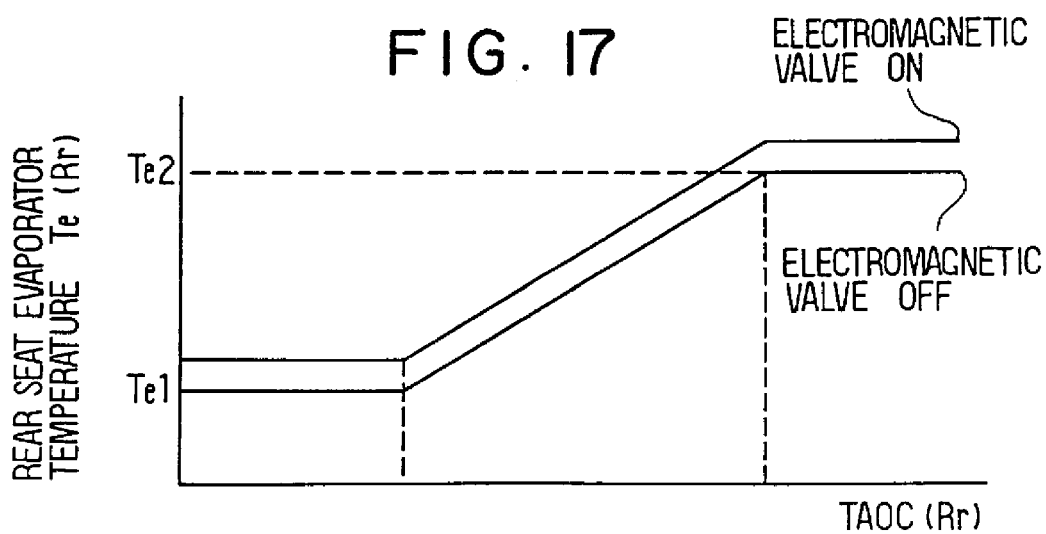
FIG. 17 is a graph showing a relationship between a rear-seat evaporator temperature Te(Rr) and a target air temperature TAOC(Rr) of the rear-seat cooler unit when an ON-OFF control is performed in an electromagnetic valve.

Further, at step S120 of FIG. 4, the electromagnetic valve 25 is controlled based on the graph of FIG. 17 pre-stored in the ROM so that the rear-seat evaporator temperature Te(Rr) detected by the rear-seat evaporator temperature sensor 39 becomes the above-described target evaporator temperature TEO(Rr). Thus, the TAOC(Rr) can be obtained.

At the next step S130, target opening degrees θ(Fr) and θ(Rr) of the air mixing doors 15 and 32 are determined based on the following equations (8) and (9) pre-stored in the ROM.

$$\theta(Fr) = 100 \times [TAO(Fr) - Te(Fr)] / [Tw - Te(Fr)] (\%) \quad (8)$$

$$\theta(Rr) = 100 \times [TAOH(Rr) - Tin(Rr)] / [Tw - Tin(Rr)] (\%) \quad (9)$$

wherein, Te(Fr) is a temperature detected by the front-seat evaporator temperature sensor 38 and Tin(Rr) is a temperature detected by the suction air temperature sensor 41.

At the next step 140, control signals are output to each actuator to obtain each mode determined at the above-described steps S50–S70, S90, S110, and S130.

At the next step S150, it is determined whether or not a predetermined control periodic time τ has elapsed. When the determination is "YES", it returns to step S20. When the determination is "NO", it still waits until the predetermined control periodic time τ has elapsed.

Next, an operation and effect of the embodiment will be described hereinafter.

(1) Firstly, in the rear-seat Bi-level mode in which the rear-seat cooler unit 2 and the rear-seat heater unit 3 are operated together, when the passenger compartment is rapidly heated (i.e., TAO(Rr)>T1) and it satisfies the air blowing stop condition, that is, the heating capacity for the air, of the heater core 30, is equal to or less than a predetermined capacity (i.e., Tw<Tw1) as well as it is not necessary to perform the cool-down control (i.e., TAO(Rr)≧T2), an operation and effect will be described.

In this time, BLWH(Rr) is set for zero (BLWH(Rr)=0) at step S1100 in FIG. 9 to prevent cool air from being blown out from the rear-seat heater unit 3, and BLWC(Rr) is set for zero (BLWC(Rr)=0) at step S1100. Therefore, an air blowing stop control for stopping air blown out from the rear-seat cooler unit 2 is performed. Thus, when air is blown out from both units 2 and 3 to realize the operation of "cooling of the head area and heating of the foot area" of a passenger at the rear seat in the passenger compartment, it can be prevented for only cool air to be blown from the cooler unit 2 not to give cool air feeling to the rear-seat passenger in the passenger compartment.

(2) Next, when water temperature Tw becomes equal to Tw1 or more while performing the above-described air blowing stop control, the operation and effect will be described.

In this time, the rear-seat heater blower voltage BLWHW (Rr) and the rear-seat cooler blower voltage BLWCW(Rr) are calculated based on FIGS. 13 and 14 at step S1110. At the time immediately after water temperature Tw becomes equal to Tw1 or more, BLWHE(Rr) and BLWCW(Rr) calculated based on FIGS. 13 and 14 are smaller than BLWH(Rr) and BLWC(Rr) calculated based on the broken lines in FIGS. 11 and 12.

Thus, at step S1120, BLWHW(Rr) and BLWCW(Rr) are calculated as a final the rear-seat heater blower voltage BLWH(Rr) and a final rear-seat cooler blower voltage BLWC(Rr). As a result, according to a rise of water temperature, the rotational speed of the fan 29 of the rear-seat heater unit 3 is gradually increased to blow out gradually warm air from the rear-seat heater unit 3 and the rotational speed of the fan 23 is gradually increased to blow out gradually cool air from the rear-seat cooler unit 2.

The graphs in FIGS. 13 and 14 are set by the above-described consideration. Therefore, after the water temperature Tw becomes equal to the Tw1 or more, each volume of the air from the cooler unit 2 and the heater unit 3 is gradually increased while maintaining equally a ratio between the volume of the cool air from the cooler unit 2 and the volume of the warm air from the heater unit 3.

Because each volume of the air from the cooler unit 2 and the heater unit 3 is not increased rapidly after the water temperature Tw becomes equal to the Tw1 or more but is increased gradually, an unpleasant feeling is not given to a passenger at the rear seat in the passenger compartment. Further, because each volume of the air from the two units 2 and 3 is increased while maintaining equally the ratio between the volume of the cool air and the volume of the warm air after the water temperature Tw becomes equal to Tw1 or more, the operation of "cooling of the head area and heating of the foot area" can be suitably performed for a passenger at the rear seat in the passenger compartment.

(3) Next, in the rear-seat Bi-level mode in which the rear-seat cooler unit 2 and the rear-seat heater unit 3 are operated together, when the passenger compartment is rapidly heated (i.e., TAO(Rr)>T1) and it satisfies the air blowing stop condition, that is, the heating capacity for the air, of the heater core 30 is equal to or less than a predetermined capacity (i.e., Tw<Tw1) as well as it is necessary to perform the cool-down control (i.e., TAO(Rr)<T2), an operation and effect will be described.

Similarly to the above-described case (1), at this time, cool air can be prevented from being blown from the rear-seat heater unit 3, and an air blowing stop control for stopping air blown from the rear-seat cooler unit 2 is performed. Therefore, when air is blown out from both units 2 and 3 to realize the operation of "cooling of the head area and heating of the foot area" for a passenger at the rear seat in the passenger compartment, it is prevented for only cool air to be blown from the cooler unit 2 not to give cool air feeling to the passenger at the rear seat in the passenger compartment.

(4) Next, when water temperature Tw becomes equal to Tw1 or more while performing the above-described air blowing stop control, an operation and effect will be described.

At this time, the rear-seat heater blower voltage BLWHW (Rr) is calculated based on FIG. 13 at step S1110 and BLWHW(Rr) is calculated as a final rear-seat heater blower voltage BLWH(Rr) at step S1120. Therefore, the rotational speed of the fan 29 of the rear-seat heater unit 3 is gradually increased according to the rise of the water temperature, so that a warm air is gradually blown out from the rear-seat heater unit 3.

On the other hand, in the cooler unit 2, the determination is "YES" at step S1150 immediately after water temperature Tw becomes equal to Tw1 or more, the rear-seat cooler blower voltage BLWC'(Rr) is set for zero at step S1170, and a final rear-seat cooler blower voltage BLWC(Rr) is calculated as BLWC'(Rr) (i.e., BLWC'(Rr)=0). Therefore, the fan 23 of the rear-seat cooler unit 2 is stopped. At this time, the rear-seat evaporator 24 is operated.

Then, when the subroutines in FIGS. 9 and 10 are called again and the determination is "NO" at step S1150, the time of the timer is counted up at step S1180 and the rear-seat cooler blower voltage BLWC'(Rr) is calculated based on the graph in FIG. 15. When the time of the timer is in the range of 0–t1, BLWC'(Rr)=0. Therefore, the final rear-seat cooler blower voltage BLWC(Rr) calculated at step S1210 is zero when the time of the timer is in the range of 0–t1, so that the fan 23 of the rear-seat cooler unit 2 maintains to be stopped.

When the time of the timer is in the range of t1–t2 after the time t1 has elapsed, BLWC'(Rr) is calculated as V2 at step S1190, and V2 is smaller than BLWC(Rr) calculated based on the graph in FIG. 14 at step 1130 in FIG. 9. Therefore, the final rear-seat cooler blower voltage BLWC (Rr) is calculated as V2 at step S1210, the rotational speed of the fan 23 is controlled based on BLWC(Rr) (i.e., BLWC(Rr)=V2), and cool air is blown out from the rear-seat cooler unit 2.

When the time of the timer is in a range of t2–t3 after the time t2 has elapsed, for example, BLWC'(Rr) calculated based on the graph in FIG. 15 at step S1190 in FIG. 10 is smaller than BLWC(Rr) calculated based on the graph in FIG. 14 at step S1130 in FIG. 9, and therefore, the final blower voltage BLWC(Rr) calculated at step S1210 in FIG. 10 is BLWC'(Rr).

When the time of the timer is more than t3 in FIG. 15, BLWC(Rr) calculated based on the graph in FIG. 14 at step S1130 in FIG. 9 becomes smaller than BLWC'(Rr) calculated based on the graph in FIG. 15 at step S1190 in FIG. 10, and therefore, the final blower voltage BLWC( Rr) calculated at step S1210 in FIG. 10 is BLWC(Rr).

Thus, after the time of the timer is more than t3, similarly to the above-described case (2), each volume of the air from the cooler unit 2 and the heater unit 3 is gradually increased according to a rise of the water temperature while maintaining equally a ratio between the volume of the cool air from the rear-seat cooler unit 2 and the volume of the warm air from the rear-seat heater unit 3.

As described above, when the water temperature Tw becomes equal to Tw1 or more and the fan 29 of the rear-seat heater unit 3 starts to be operated, the fan 23 of the rear seat cooler unit 2 is not rapidly driven based on BLWCW(Rr) calculated from FIG. 14, and the cool-down control is performed, that is, only the rear-seat evaporator 24 is operated while stopping once the fan 23 for a predetermined time, and then, the rotational speed of the fan 23 is gradually increased. Therefore, air mixed with warm air or foul-smelling air can be prevented from being blown into the passenger compartment from the cooler unit 2 when the fan 23 is driven after water temperature Tw becomes equal to the Tw1 or more.

Modifications of the embodiment of the present invention will be described.

In the above described embodiment, the air conditioning apparatus includes the rear-seat cooler unit 2 and the rear-seat heater unit 3, and the air blowing stop control is performed for the rear-seat side of the passenger compartment. However, the air conditioning apparatus may include a front-seat cooler unit for cooling the upper half body of a front seat passenger in the passenger compartment and a front-seat heater unit for heating the lower half body of a passenger at the front seat in the passenger compartment, and the air blowing stop control may be performed for the front-seat side of the passenger compartment.

In the above-described embodiment, the cool-down control is performed after finishing the warm-up control. However, the rotational speed of the fan of the cooler unit may be gradually increased immediately after finishing the warm-up control without performing the cool-down control.

In the above-described embodiment, the volume of the air blown out into the passenger compartment is gradually increased according to a rise of the water temperature. However, the volume of the air may be increased with a predetermined ratio by using a timer, or the volume of the air may be increased to change the time of the timer according to a temperature of the outside air.

In the above-described embodiment, the rear-seat heater unit 3 is an air mixing type unit for adjusting a temperature of the blown-air by adjusting the opening degree of the air mixing door 32. However, the rear-seat heater unit 3 may employ a reheat type unit for adjusting a temperature of the blown-air by adjusting flow rate or a temperature of warm water flowing into the rear-seat heater core 30.

Further, in the above-described embodiment, the heating heat exchanger is constituted by the rear-seat heater core 30 utilizing an engine cooling water as the heat source. However, the heating heat exchanger may be constituted by a condenser of a heat pump type refrigerant cycle or, by a heat exchanger utilizing an electric power as the heat source (e.g., heater).

Although the present invention has been fully described in connection with preferred embodiment thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An air conditioning apparatus for a vehicle having a passenger compartment, comprising:

a cooler unit having a first case forming a first air passage for introducing air toward the upper half body of a passenger in said passenger compartment, first air blowing means for blowing air in said first air passage, and a first heat exchanger for cooling air blown from said first air blowing means;

a heater unit having a second case forming a second air passage for introducing air toward feet of said passenger in said passenger compartment, second air blowing means for blowing air in said second air passage, and a second heat exchanger for heating air blown from said second air blowing means;

second air blowing stopping means for stopping said second air blowing means when said passenger compartment is rapidly heated and a heating capacity of said second heat exchanger is less than a predetermined capacity;

control means for gradually increasing an air blowing capacity of said second air blowing means according to a rise of said heating capacity when said heating capacity reaches said predetermined capacity while stopping said second air blowing means; and first air blowing stopping means for stopping said first air blowing means when both of said cooler unit and said heater unit are operated and when said passenger compartment is rapidly heated and a heating capacity of said second heat exchanger is less than a predetermined capacity.

2. An air conditioning apparatus according to claim 1, wherein said control means gradually increases an air blowing capacity of said first blowing means according to said rise of said heating capacity when said heating capacity reaches said predetermined capacity while stopping said second air blowing means.

3. An air conditioning apparatus according to claim 2, wherein said control means increases gradually said air blowing capacity of said first air blowing means and said air blowing capacity of said second air blowing means while maintaining equally a ratio between a volume of air blown out from said cooler unit and a volume of air blown out from said heater unit.

4. An air conditioning apparatus according to claim 1, wherein, said first air blowing stopping means maintains said first air blowing means to be stopped for a predetermined time after said heating capacity of said heating heat exchanger reaches said predetermined capacity while stopping said second air blowing means, and said control means increases said air blowing capacity of said first air blowing means gradually after said predetermined time has elapsed.

5. An air conditioning apparatus according to claim 4, wherein said control means increases gradually said air blowing capacity of said first air blowing means and said air blowing capacity of said second air blowing means while maintaining equally a ratio between a volume of air blown out from said cooler unit and a volume of air blown out from said heater unit after said predetermined time has elapsed.

6. An air conditioning apparatus according to claim 1, wherein said heating capacity of said second heat exchanger is determined by a temperature of an engine cooling water.

7. An air conditioning apparatus according to claim 6, further comprising:

a cooling water temperature sensor for detecting said temperature of said engine cooling water.

8. An air conditioning apparatus according to claim 1, further comprising:

first blower voltage calculating means for calculating a first voltage applied to said first air blowing means; and second blower voltage calculating means for calculating a second voltage applied to said second air blowing means, wherein, said first voltage applied to said first air blowing means is set for zero when said first air blowing stopping means operates; and said second voltage applied to said second air blowing means is set for zero when said second air blowing stopping means operates.

9. An air conditioning apparatus for a vehicle having a passenger compartment, comprising:

a cooler unit for blowing cool air toward an upper half body of a passenger in said passenger compartment, said cooler unit having first air blowing means for blowing air into said passenger compartment and a first heat exchanger for cooling air blown from said first air blowing means; and a heater unit for blowing warm air toward feet of the passenger in said passenger compartment, said heater unit having second air blowing means for blowing air into said passenger compartment and a second heat exchanger for heating air blown by said second air blowing means, wherein, said second air blowing means are stopped when said passenger compartment is rapidly heated and there is satisfied an air blowing stop condition in which a heating capacity of said second heat exchanger is less than a predetermined capacity, an air blowing capacity of said second air blowing means is gradually increased according to a rise of said heating capacity when said heating capacity reaches said predetermined capacity after said air blowing stop condition has been satisfied, and said first air blowing means are stopped, when both of said cooler unit and said heater unit are operated and when said air blowing stop condition is satisfied.

* * * * *